United States Patent [19]

Kawamoto et al.

[11] Patent Number: 4,687,216
[45] Date of Patent: Aug. 18, 1987

[54] FRONT AND REAR WHEEL STEERING DEVICE FOR VEHICLE

[75] Inventors: Yoshimich Kawamoto; Yoshimi Furukawa; Tetsuro Hamada; Mitsuya Serizawa, all of Tochigi, Japan

[73] Assignee: Honda Giken Kogyo Kabushiki Kaisha, Tokyo, Japan

[21] Appl. No.: 844,803

[22] Filed: Mar. 27, 1986

[30] Foreign Application Priority Data

Mar. 27, 1985 [JP] Japan .................................. 60-62359
Mar. 27, 1985 [JP] Japan .................................. 60-62360

[51] Int. Cl.$^4$ ............................................. B62D 6/02
[52] U.S. Cl. .................................................... 280/91
[58] Field of Search ................... 280/91; 180/143, 142, 180/141, 140

[56] References Cited

U.S. PATENT DOCUMENTS 4,566,710 1/1986 Farakawa et al. ..................... 280/91

FOREIGN PATENT DOCUMENTS 2148222 5/1985 United Kingdom .................. 280/91

Primary Examiner—David M. Mitchell
Assistant Examiner—Karin L. Ferriter
Attorney, Agent, or Firm—Lyon & Lyon

[57] ABSTRACT

In a front and rear wheel steering device for vehicle for variably controlling the steering angle ratio of rear wheels relative to the steering angle of front wheels according to a certain mathematical function of vehicle speed in such a manner that the rear wheels are steered in opposite phase relationship in a low speed range and in same phase relationship in a high speed range, by providing a selection means for manually selecting a special mathematical function for an extremely low speed range which will cause a same phase relationship at an extremely low speed and a smooth transition to the certain mathematical function, parking the car along a curbstone and changing the lateral position of the vehicle in a limited space are simplified since the rear part of the vehicle will not swing laterally. Since such a manual setting is not suitable for low to medium speed range, a means for automatically releasing the manual selection may be advantageously provided to the system to the end of reducing the burden on the driver.

5 Claims, 5 Drawing Figures 5

FRONT AND REAR WHEEL STEERING DEVICE FOR VEHICLE

BACKGROUND OF THE INVENTION

This invention relates to a front and rear wheel steering device for vehicles such as four-wheel vehicles.

The present inventors have previously proposed a steering device for vehicle which steers the rear wheels in relation with the steering of the front wheels according to vehicle speed in copending U.S. Pat. applications Nos. 821,998, 822,000, 822,008, 822,010, 822,043, and 822,293, all of which were filed on Jan. 24, 1986 and assigned to the same assignee. According to these devices, rear wheels are generally steered in the same phase relationship or none at all in high speed range and are steered in the opposite phase relationship in low speed range. The steering angle ratio is a continuous function of the vehicle speed, with the steering angle ratio assuming a positive value or a same phase relationship when the vehicle speed is greater than a certain value and assuming a negative value or a opposite phase relationship when the vehicle speed is lower than it (refer to "Q" in FIG. 5), whereby the functionality of the steering device is adapted to both high and low speed ranges.

As a result, the minimum angle of turning and the inner radius difference of the vehicle are both drastically reduced and the maneuverability of the vehicle, particularly in low speed range, in driving the vehicle into a garage, driving the car through narrow and crooked alleys and making a U-turn, is substantially improved with the additional advantage of improving the dynamic lateral response of the vehicle in high speed range, for instance in changing driving lanes.

Such a four wheel steering system is highly convenient in driving through narrow streets and parking the car in a limited space in low speed range by setting the steering ratio to the opposite phase relationship and reducing the inner radius difference, but it has the disadvantage that the rear part of the vehicle is swung laterally when turning and parking the car along a curbstone, and changing the lateral position of the vehicle in a limited space become difficult. Therefore, it is desired that the steering angle ratio may be manually set to about 1.0 in the same phase relationship in low speed range when necessary.

In such a case, however, the driver must release the manual selection before the vehicle speed has increased beyond a certain level since the maneuvering of the vehicle, in particular turning the vehicle, becomes difficult if the steering ratio is about 1.0 in the same phase relationship, and such a necessity to release the manual setting is burdensome to the driver because failure to release the manual setting will cause difficulty in maneuvering the vehicle particularly in low to medium speed range.

BRIEF SUMMARY OF THE INVENTION

In view of such problems, a primary object of this invention is to provide a front and rear wheel steering device for vehicle for variably controlling the steering angle ratio of rear wheels relative to the steering angle of front wheels according to a certain mathematical function of vehicle speed in such a manner that the rear wheels are steered in opposite phase relationship in a low speed and in same phase relationship in a high speed, according to which parking the car along a curbstone and changing the lateral position of the vehicle can be readily performed as such necessity arises in extremely low speed range.

Another object of the present invention is to provide a front and rear wheel steering device which is provided with a manual means for fixing the steering angle ratio of the rear wheels to a same phase relationship in extremely low speed range.

Yet another object of the present invention is to provide a front and rear wheel steering device which is provided with such a manual means and yet will not impose a burden on the driver.

According to this invention, such an object is accomplished by providing a front and rear wheel steering device for vehicle for variably controlling the steering angle ratio of rear wheels relative to the steering angle of front wheels according to a certain mathematical function of vehicle speed in such a manner that the rear wheels are steered in opposite phase relationship in a low speed range and in same phase relationship in a high speed range, comprising: a selection means for manually selecting a special mathematical function for an extremely low speed range which will cause a same phase relationship at an extremely low speed and a smooth transition to the certain mathematical function.

Thus, since the steering angle ratio of the rear wheels may be set to a same phase relationship and the vehicle can advance or back up in an oblique fashion, parking the vehicle along a curbstone or a wall and changing the lateral position of the vehicle (by advancing obliquely and retreating again obliquely) both become simple in extremely low speed range.

According to a certain aspect of the present invention, since the manual selection for the extremely low speed range is automatically released when the vehicle speed has exceeded a certain low speed level, the driver will not encounter any difficulty in maneuvering the vehicle in low to high speed range even when he has failed to manually release the manual selection. Thus, since the driver can increase the vehicle speed without releasing the manual selection, no burden is imposed on the driver and yet the maneuverability of the vehicle in low speed range is maintained.

The special mathematical function for extremely low speed range which achieves the same phase relationship in the extremely low speed range may connects to the normal mathematical function in a smooth manner either with or without going through a region of an opposite phase relationship. The manners in which the special mathematical function connects with the normal mathematical function can be selected as desired either by the designer of the vehicle or the driver of the vehicle.

BRIEF DESCRIPTION OF THE DRAWINGS

Now an embodiment of this invention is described in the following with reference to the appended drawings, in which.

DETAILED DESCRIPTION OF THE PREFERRED EMBODIMENT

Figure 1:
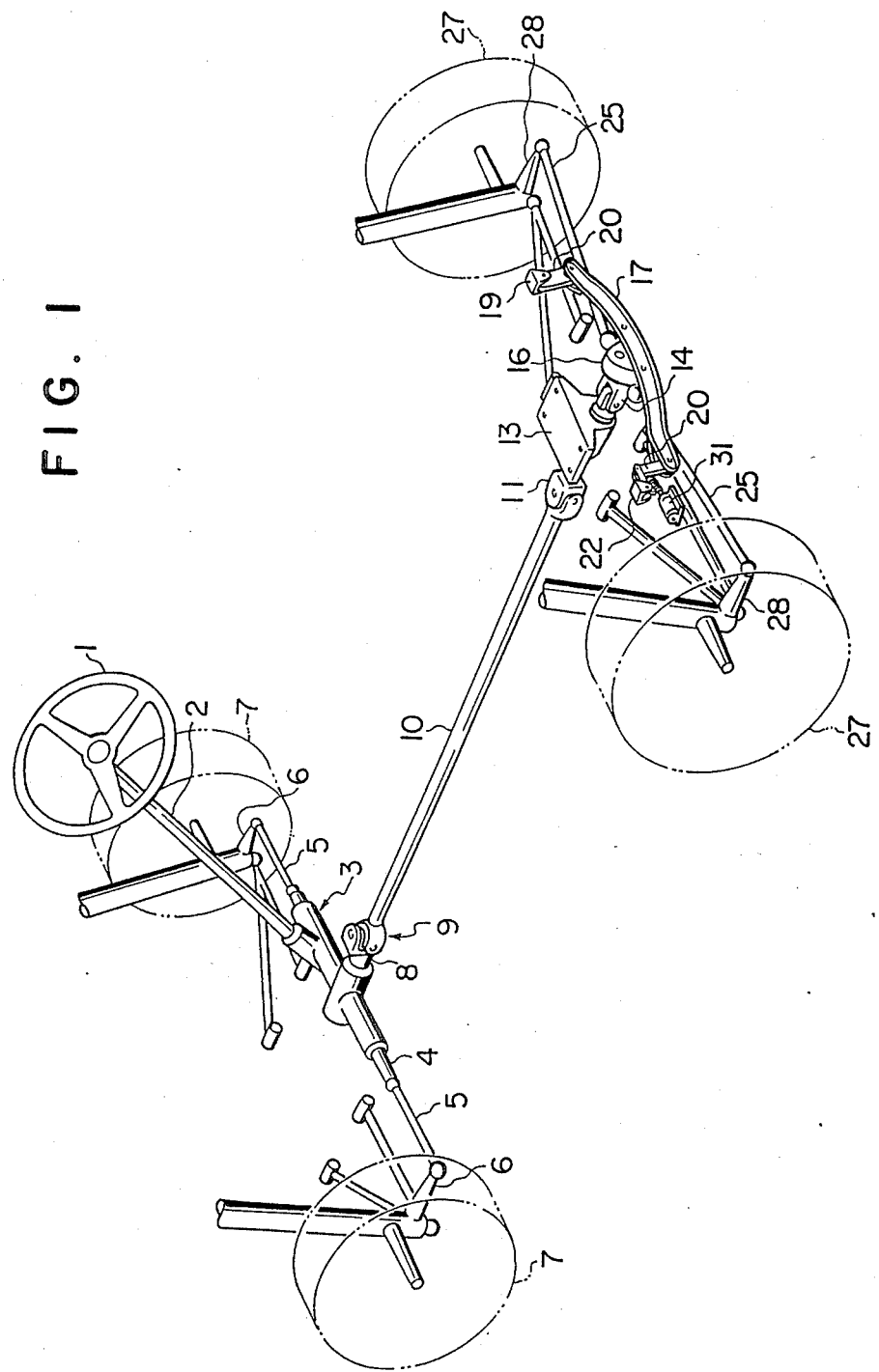
FIG. 1 is a perspective view showing the general basic structure of a vehicle provided with a front and rear wheel steering device to which this invention is applied.
Figure 2:
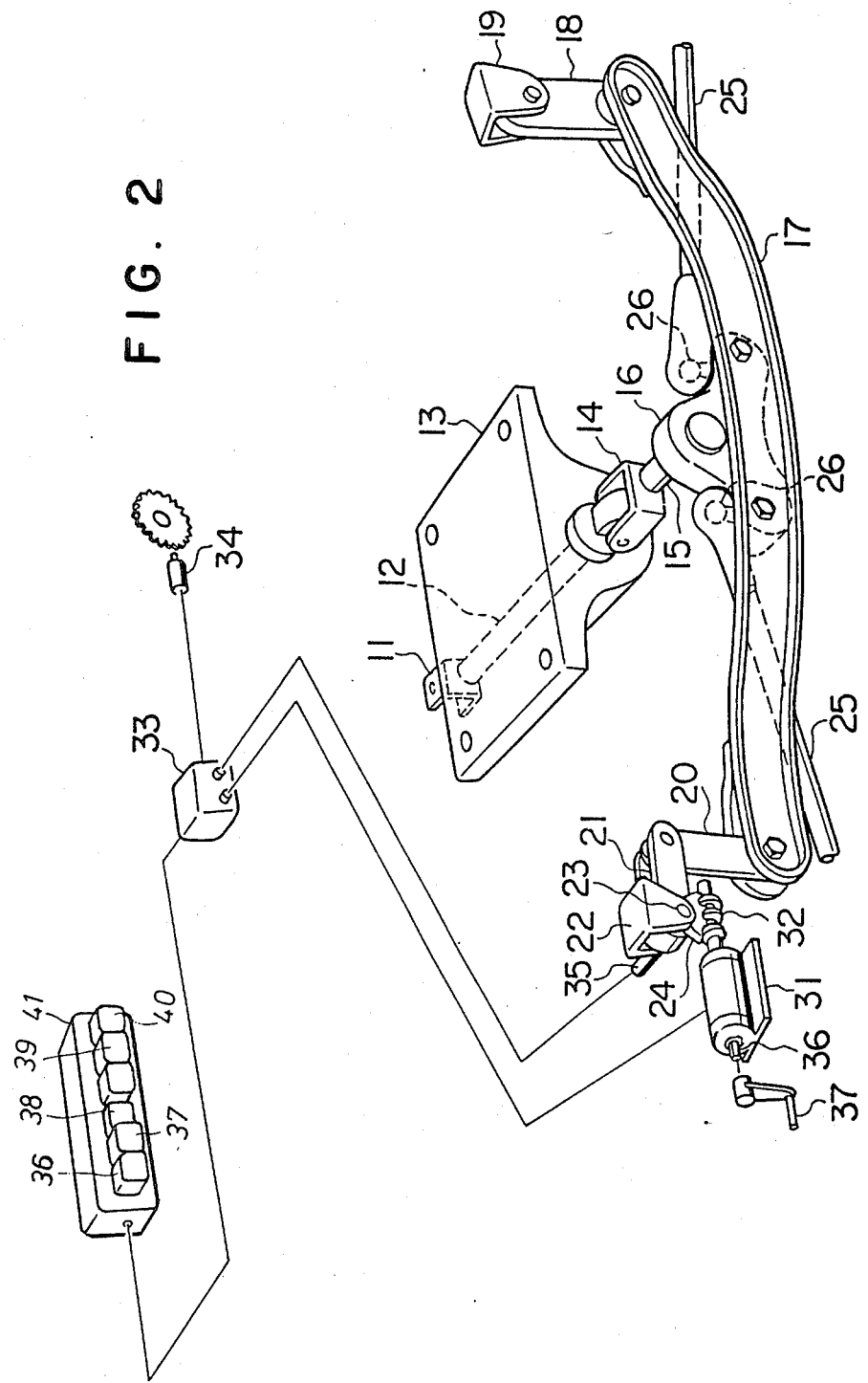
FIG. 2 is a magnified perspective view of the rear wheel steering system.
Figure 3:
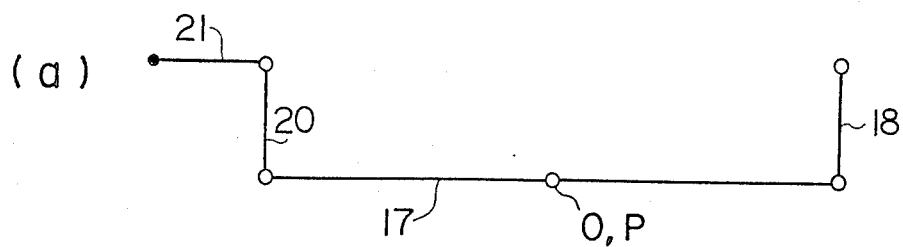
FIG. 3 (a), (b) and (c) are conceptual views illustrating the working principle of the rear wheel steering system.
Figure 3:
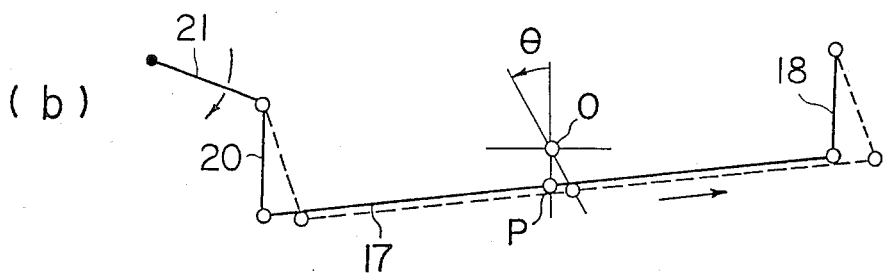
Figure 3:
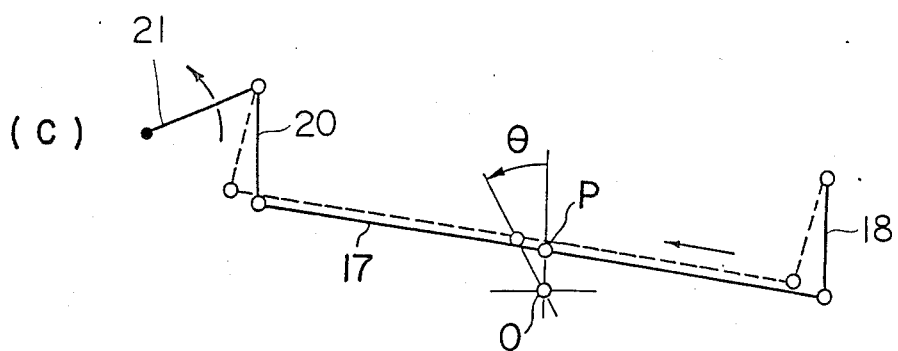

FIGS. 1 to 3 show an embodiment of the structure of the front and rear wheel steering device to which this invention is applied. A steering column shaft 2 of a steering wheel 1 is joined into a rack and pinion type gear box 3, and a pair of tie rods 5 are connected to the two ends of a rack shaft 4. To the external ends of the tie rods 5 are connected a pair of knuckle arms 6 which support front wheels 7, respectively, in such a manner that the front wheels 7 can be steered to the direction determined by the steering wheel 1 in the known manner.

Meanwhile, a pinion shaft 8 extends from the gear box 3 to the rearward direction and an elongated linkage shaft 10 is connected to the rear ends of the pinion shaft 8 by way of a universal joint 9. And an input shaft 12 is connected to the rear end of the linkage shaft 10 by way of another universal joint 11.

This input shaft 12 is disposed along the longitudinal center line of the rear part of the vehicle and is rotatably supported by a bearing bracket 13.

Further, a swing shaft 15, which is described in greater detail in FIG. 2, is connected to the rear end of the input shaft 12 by way of a clevis 14, and a joint member 16 is loosely fitted over a middle portion of the swing shaft 15. The two lateral ends of the joint member 16 are connected to tie rods 25 by way of ball joints 26 respectively, and the joint member 16 is fixedly supported in a middle part of an arm member 17 which is arranged along the widthwise direction of the vehicle.

An end of the arm member 17 is connected to the vehicle body by way of a link member 18 and a link bracket 19 while the other end of the arm member 17 is connected to the vehicle body by way of a pair of link members 20 and 21 and a link bracket 22. A pivot shaft 23 of the link member 21 on the side of the bracket 22 can rotate integrally with the link member 21. The external ends of the tie rods 25 are connected to knuckle arms 28 which support rear wheels 27 as shown in FIG. 1.

A motor 31 is mounted in a part of the vehicle body located on the side of the other end of the arm member 17 and an output shaft of the motor 31 is fixedly provided with a worm gear 32 which in turn meshes with a sector gear 24 integrally mounted to the pivot shaft 23 of the link member 21. A crank handle 37 (FIG. 2) which may be fitted to the other end 36 of the output shaft of the motor 31 is for manually restoring the steering angle of the rear wheels in case of a failure of the rear wheel steering system. Further, the vehicle is provided with a computer 33 which receives signals from a vehicle speed sensor 34 for detecting the vehicle speed and a position sensor 35 which detects the angular position of the pivot shaft 23 of the link member 21 and sends an appropriate control signal to the motor 31 according to the vehicle speed to control the rotation of the motor 31. The computer 33 is further connected to a manual selection switch 41 so that the control of the steering angle ratio of the rear wheels may be accomplished according to a mathematical function selected on the manual selection switch 41.

Now the mechanical action of the rear wheel steering system is described in the following particularly with reference to FIGS. 3(a) to 3(c).

When the pivot point P of the joint member 16 coincides with the center O of the input shaft 12 as shown in FIG. 3 (a), the input shaft 12 and the swing shaft 15 rotate in a coaxial manner, and therefore the joint member 16 will not laterally swing and the tie rods 25 remain stationary so that only the front wheels 7 are steered and the rear wheels 27 are not steered at all, in the same manner as in a conventional vehicle.

When the link member 21 is downwardly rotated by rotation of the motor 31 by way of the worm gear 32 and the sector gear 24 meshing therewith, the arm member 17 inclines with its left end down as shown in FIG. 3 (b). Due to this inclination of the arm member 17, the pivot point P is located below the axial center O of the input shaft 12 and, if the input shaft 12 is rotated for instance in counter-clockwise direction by angle theta, the tie rods 25 move rightwardly as indicated by broken lines in FIG. 3 (b), to steer the rear wheels 27 in the direction opposite to the steering direction of the front wheels 7.

When the link member 21 is upwardly rotated by reverse rotation of the motor 31, the arm member 17 inclines with its left end up as shown in FIG. 3 (c). Due to this inclination of the arm member 17, the pivot point P is located above the axial center O and, if the input shaft 12 is rotated for instance likewise in counter-clockwise direction by angle theta, the tie rods 25 move leftward, as opposed to the previous case, as indicated by broken lines in FIG. 3 (c), to steer the rear wheels 27 in the same direction as the front wheels 7.

Now the control action of the above-described embodiment will be described in the following with reference to FIGS. 4 and 5.

Figure 4:
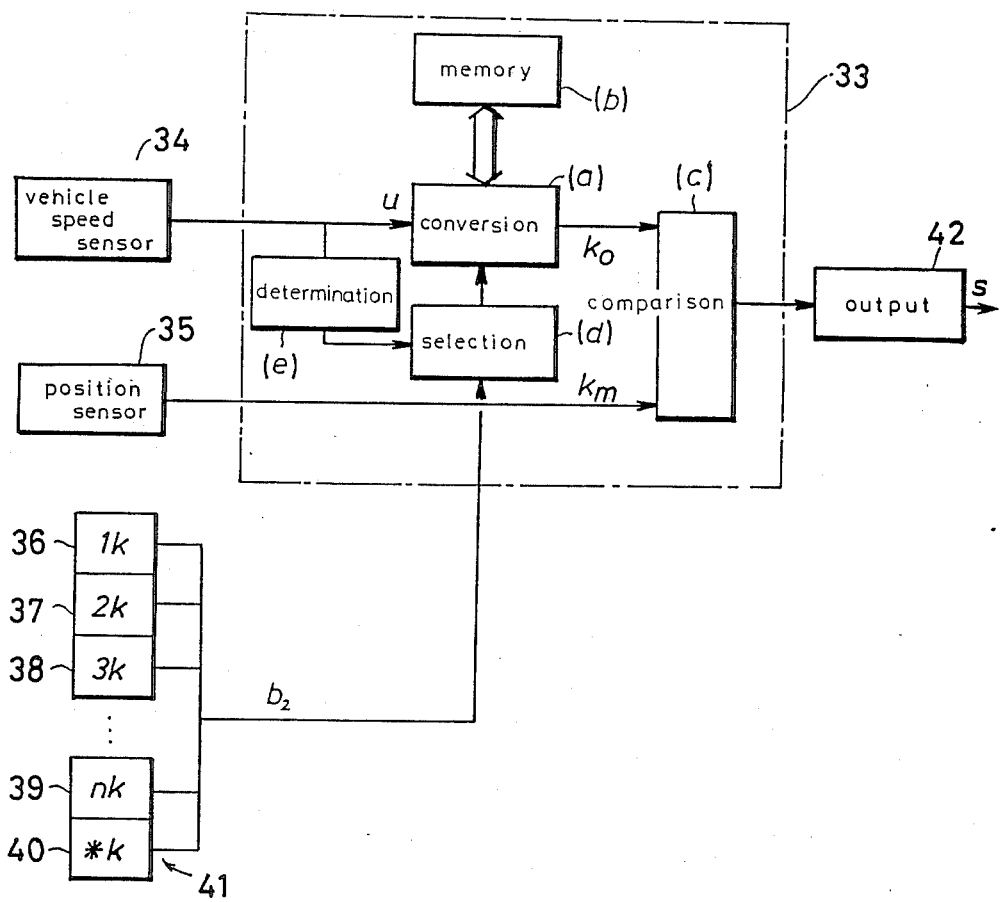
FIG. 4 is a functional block diagram of the computer which is mounted to the vehicle.

FIG. 4 shows the functional structure of the computer 33. The vehicle speed signal detected by the vehicle speed sensor 34 is supplied to the computer 33 as a certain vehicle speed signal u. This vehicle speed signal u is converted into a predetermined steering angle ratio signal $k_0$ (f=u)) by a conversion process (a). In this conversion process (a), the vehicle speed signal u is converted into steering angle ratio data according to one of a plurality of conversion properties shown in FIG. 5 based on a plurality of mathematical function data $f_1, f_2, \ldots$ stored in the memory (b) of the computer 33.

Figure 5:
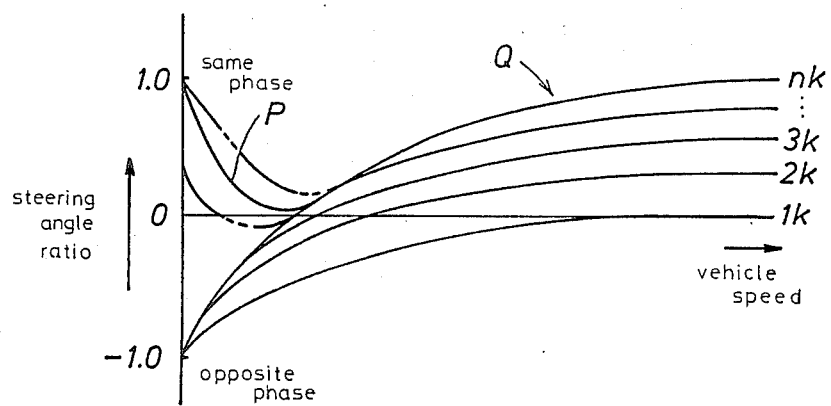
FIG. 5 is a steering angle ratio property graph of the above mentioned embodiment.

The selection information $b_2$ selected on the selection switch 41 is supplied to the conversion process (a) by way of a selection process (d) and one of the plurality of curves shown in FIG. 5 is selected or, in other words, one of the predetermined steering angle ratio function properties 1K, 2K, ... nK, *K is selected. These different properties correspond to the respective push buttons 36 to 40 in the selection switch 41 and the conversion process (a) converts the actual vehicle speed into corresponding steering angle ratio data according to the properties selected from the conversion properties shown in FIG. 5. These push buttons 36 to 40 are self-illuminated push-buttons whereby the driver can readily know which of the steering angle ratio functions is being selected.

The position sensor 35 detects the rotational position of the link member 21 which is proportional to the steering angle ratio in actual steering and the detected result is supplied to the computer 33 as an actual steering angle ratio $k_m$. A relative difference delta $k = k_m - k_0$ is obtained by a comparison process (c). This difference delta k is supplied from the computer 33 to an output control device 42 as data corresponding to the correction of the steering angle ratio which is required to obtain the desired steering angle ratio. The output end of the output control device 42 is connected to the motor 31 and the output control device 42 supplies thereto a control signal s corresponding to the difference delta k. Thus, the motor 31 is rotated in the direction which accomplishes the steering angle ratio corresponding to the current vehicle speed.

As shown in FIG. 5, the properties of the steering angle ratio functions of the vehicle speed are so selected that they may be expressed by a plurality of curves branching off from a curve corresponding to nK in a mutually parallel manner, and the curves on the side of the curve 1K represent sport driving while the curves with higher numbers represent easier driving.

In particular, according to the present invention, the "*K" push button 40 is provided for the convenience of displacing the vehicle laterally and parking the vehicle along a curbstone, and depressing this push-button causes the steering angle ratio to be represented by a curve P which is approximately 1.0 in the same phase relationship in extremely low speed range and, after touching a horizontal line corresponding to zero steering angle ratio as the vehicle speed increases, smoothly connects to the curve nK. Since there is no change in the steering property of the vehicle in medium to high speed ranges even when this steering angle property is selected, the driver is not required to release such a selected state and the operability of the vehicle is not impaired. The property for this special mathematical function for extremely low speed range may be selected as required and may cause opposite phase relationship in a medium speed range or cause same phase relationship throughout the medium speed range as indicated by imaginary lines above and below line P in FIG. 5. Also, the steering angle ratio in the extremely low speed may not be 1.0 but may be any other value between 0 and 1.0.

Furthermore, if the vehicle speed is to be reduced after the vehicle speed has reached a high speed level, a normal steering angle ratio, for instance the one represented by the nK curve, is automatically selected even in the extremely low speed unless the "*K" push-button is depressed anew. Therefore, even when the same phase relationship in the extremely low speed range has been selected, the advantages of the four wheel steering in medium to high speed range are maintained, and, when the vehicle speed is reduced again, the original opposite phase relationship will be restored.

This is accomplished by selecting a mathematical function corresponding to the above described special steering angle ratio property represented by P in FIG. 5 from the memory (b) according to the output from the selection process (d) when the "*K" push-button 40 is depressed; comparing the vehicle speed with a certain reference value to detect the vehicle speed crossing the reference value; and changing the selected state when the vehicle speed has exceeded the reference value so that the selected state may be replaced from the one represented by P in FIG. 5 by the one represented by nK in FIG. 5. As a result, even when the property which causes a same phase relationship in the extremely low speed range is selected by depressing the "*" push-button 40, when the vehicle speed is increased beyond the reference value and reduced again to a low speed range, the steering angle ratio assumes a same phase relationship according to the property represented by nK in FIG. 5.

In the above-described embodiment, the various processes conducted in the computer 33 are executed by a certain program (software) stored for instance in a storage area of the computer 33, but it is possible to utilize electric circuitry having a similar functionality to perform the same processes. And the selection switch may also be a slide switch which is capable of continuous variation, instead of the push-button switch of the above described embodiment.

Further, this invention is not limited by the above-described embodiments, but may also be applied to front and rear wheel steering devices in which the front and the rear wheels are hydraulically controlled and the front steering angle information is transmitted by hydraulic pressure, or the front wheel steering angle is transmitted to the computer 33 as an electric signal.

Thus this invention can provide a steering angle properties which are favorable for displacing the vehicle laterally and parking the vehicle along a curbstone, in addition to the conveniences of a front and rear wheel steering device in that the driving response is favorable in high speed range and the maneuverability of the vehicle is favorable in low speed range. Furthermore, since the steering angle ratio property will not make a sudden change and increasing the vehicle speed will not cause any inconvenience in the maneuvering of the vehicle even when such a special steering angle ratio property is selected, the maneuverability and handling of the four wheel steering vehicle are even more improved.

What we claim is:

1. A front and rear wheel steering device for vehicle for variably controlling the steering angle ratio of rear wheels relative to the steering angle of front wheels according to a certain mathematical function of vehicle speed in such a manner that the rear wheels are steered in opposite phase relationship in a low speed range and in same phase relationship in a high speed range, comprising:
    a selection means for manually selecting a special mathematical function for an extremely low speed range which will cause a same phase relationship at an extremely low speed and a smooth transition to the certain mathematical function.

2. A front and rear wheel steering device for vehicle as defined in claim 1, wherein the manual selection means can cause the steering angle ratio of the rear wheels relative to the front wheels to be substantially 1.0 in the same phase relationship in the extremely low speed range.

3. A front and rear wheel steering device for vehicle as defined in claim 1 or 2, wherein, when the manual selection is made, the steering angle ratio assumes a same phase relationship throughout as the vehicle speed is increased from an extremely low speed to medium to high speed.

4. A front and rear wheel steering device for vehicle as defined in claim 1 or 2, wherein, when the manual selection is made, the steering angle ratio changes from a same phase relationship, an opposite phase relationship and again to a same phase relationship as the vehicle speed is increased from an extremely low speed to medium to high speed.

5. A front and rear wheel steering device for vehicle as defined in claim 1, further comprising a speed detection means which releases the manual selection when the vehicle speed has exceeded a certain low level.

* * * * *